Oct. 1, 1929.  W. R. MITTENDORF  1,729,788
COMPUTING SCALE
Original Filed Sept. 23, 1922   2 Sheets-Sheet 1
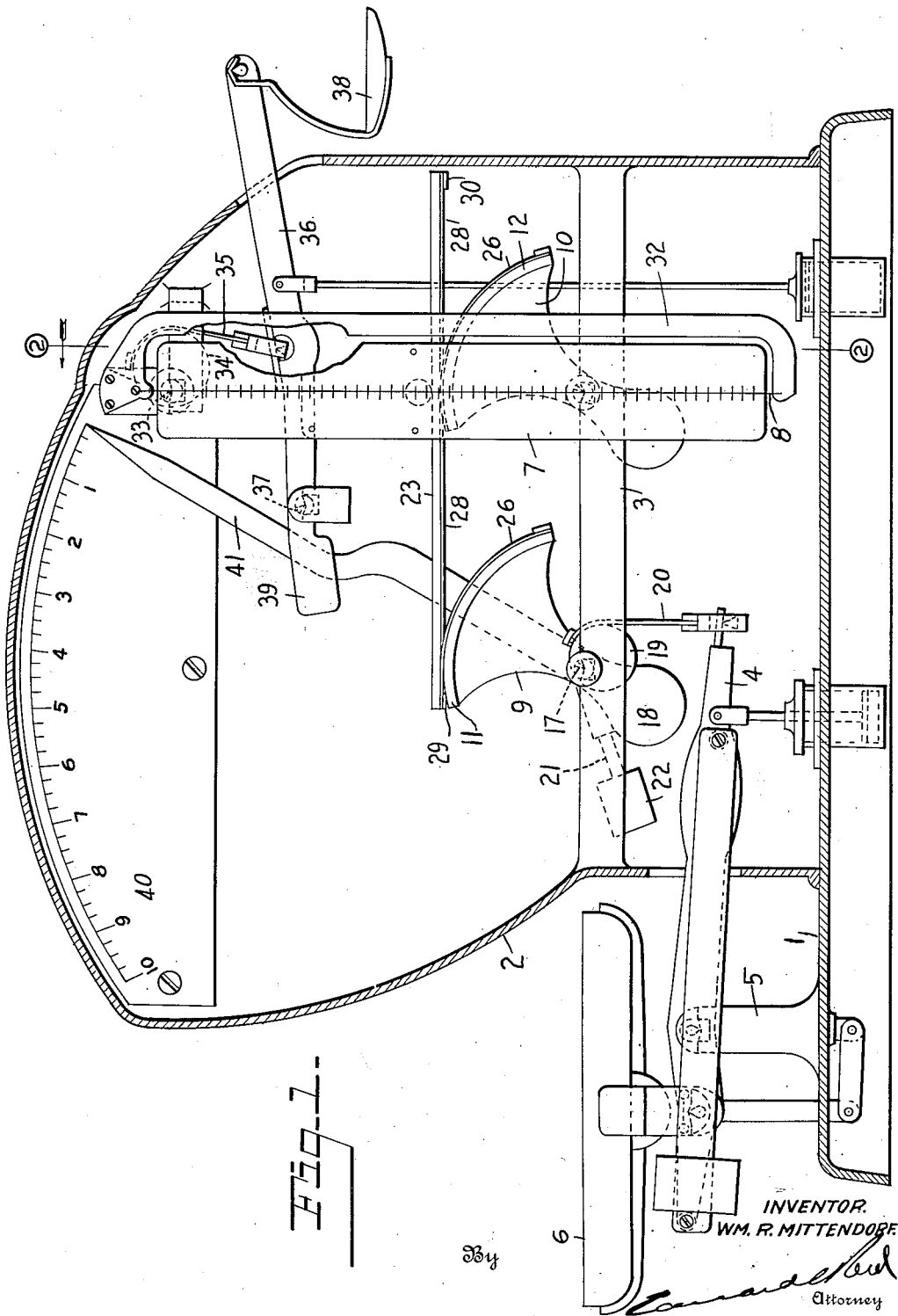
INVENTOR.
WM. R. MITTENDORF.
By
Attorney Oct. 1, 1929.  W. R. MITTENDORF  1,729,788
COMPUTING SCALE
Original Filed Sept. 23, 1922  2 Sheets-Sheet 2
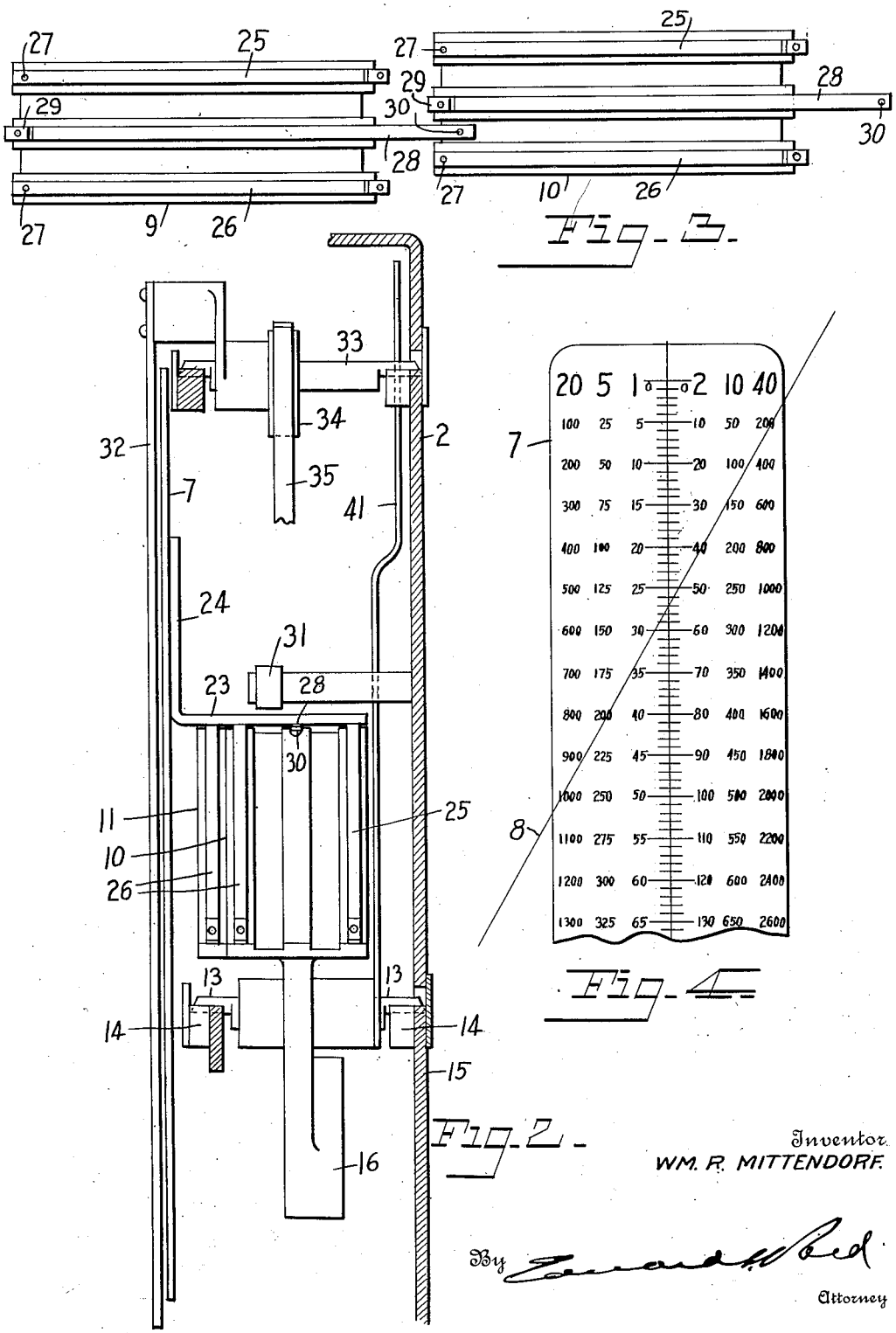

Patented Oct. 1, 1929

1,729,788

UNITED STATES PATENT OFFICE

WILLIAM R. MITTENDORF, OF CINCINNATI, OHIO, ASSIGNOR, BY MESNE ASSIGNMENTS, TO INTERNATIONAL BUSINESS MACHINES CORPORATION, OF NEW YORK, N. Y., A CORPORATION OF NEW YORK

COMPUTING SCALE

Original application filed September 23, 1922, Serial No. 590,085. Divided and this application filed August 17, 1923. Serial No. 657,913.

This invention relates to computing scales and the present application is a division of the application filed by me September 23, 1922, Serial No. 590,085.

One object of the invention is to provide a scale in which the computing chart will be moved in a substantially straight line and in which the divisions of movement of said chart will be equal for equal increments of weight on the platform of the scale.

A further object of the invention is to provide a scale of the type shown and described in the above mentioned application in which the movement of the computing chart will be controlled by the load balance.

A further object of the invention is to provide a scale having the above mentioned characteristics which will be simple in construction and operation and in which the operative parts will not be easily disarranged.

Other objects of the invention will appear as the device is described in detail.

In the accompanying drawings Fig. 1 is a front elevation, partly broken away, of a scale embodying my invention; Fig. 2 is a section taken on the line 2—2 of Fig. 1; Fig. 3 is a plan view of the pivoted segments with the connecting plate removed; and Fig. 4 is a fractional view showing portions of the cooperating indicating members.

In these drawings I have illustrated one embodiment of my invention and have shown the same as applied to a scale comprising a main frame consisting of a base 1 and upright members 2 rigidly connected one to the other by a transverse bar 3. The upright members, in the present construction, constitute a part of the casing which encloses the computing mechanism. Mounted on the base 1 and within the casing 2 is a load balance, or load operated weighing mechanism, which, as here shown, comprises a lever 4 pivotally mounted on standards 5 and having supported on the outer end thereof a load receptacle or platform 6. This lever is here shown as a lever of the first principle but it may be of any suitable character.

The computing mechanism comprises two cooperating indicating members one of which is in the form of an elongated chart 7 and the other of which is in the nature of a long thin member such as a wire 8. These two indicating members are mounted for movement independently of one another but are so arranged that they may be moved into intersecting positions and their movements are so controlled that the graduation on the chart which is intersected by the other indicating member will indicate the result of the computation. In the present instance, the chart is arranged in a vertical position and means controlled by the lever 4 are provided to cause the same to move in a straight line transverse to its length. Any suitable means may be provided for moving the other indicating member, the character of this means depending in a measure upon the character of the computation to be effected. In the present scale, which as here shown is designed for counting by weight, I utilize a unit balance for actuating the second indicating member, which is operatively connected with the unit balance and may, if desired, constitute a part thereof.

In a scale of this type it is important to the accuracy of the computation that the chart should move in a straight line and that the divisions of its movement should be equal for equal increments of weight on the load platform. This may be accomplished in various ways but, in the present machine, I have provided means for supporting the chart upon an oscillating structure on which is mounted a supporting device so arranged that it will move in a straight line and the chart is mounted on this supporting device. As here shown, the oscillating structure comprises two members or arms 9 and 10 having their outer end portions in the form of segments 11 and 12, the segmental surfaces being of considerable width. These segmental arms are pivotally mounted at their axes on the main frame, in the same horizontal plane, and their radii are of the same length. The arm 10 is rigidly secured to a pivot pin 13 having knife edged portions mounted in bearings 14 carried by the transverse frame member 3 and by the back wall of the casing, respectively. The arm is preferably counterweighted, as shown at 16, to counterbalance the weight of the segmental end of the arm. The segmental arm 9 is pivotally mounted at 17 in a manner similar to the mounting of the arm 10 and is also counterbalanced by a weight 18. Rigidly secured to the pivot pin of one of the segments, in the present instance the segment 9, is a cam 19 which is connected by a strap 20 with the end of the lever 4 of the load balance. I have also secured to the pivot pin of the segmental arm 9 a pendulum rod 21 having mounted thereon a pendulum 22. Preferably the pendulum is of the reverse type, which descends as the load is applied to the lever, and, as here shown, it is held normally in its elevated position by the weight of the lever 4 and its associated parts and when the end of the lever is raised by a load on the platform 6 the pendulum will move downwardly and actuate the indicating members connected therewith, the movement of the pendulum being in direct proportion to the weight on the platform. It will be obvious, however, that the pendulum may be arranged in any suitable manner.

The two segmental arms are connected one to the other by a suitable connecting member which is preferably in the form of a plate or bar 23 to which the indicator chart 7 is secured. In the present instance, the plate 23 has an upturned portion 24 to which the chart is rigidly secured, preferably by riveting the same thereto. The supporting plate or bar 23 is maintained at all times in such a position that it will support the chart in a true vertical position and will move the same transversely to its length and inasmuch as the bar or supporting plate rests upon peripheries of the segmental portions of the arms and these segmental portions are described about the axes of the respective arms it will be apparent that the bar is supported always at the same distance above these axes and that it will move in a straight line as the segment arms rock from one position to another, under the influence of the load on the platform, thereby causing the chart to be moved in a straight line and enabling the divisions of that movement to be equal for equal increments of weight on the platform. In the construction here shown the segment is connected with the plate 23 by means of flexible straps or ribbons, each of which is attached at one end to one of the segments and at the other end to the supporting bar, the arrangement of the straps being such as to hold the supporting plate firmly in position on the segment but to permit the same to have longitudinal movement as the segments rock about their axes. In the present structure each segment has secured to the right hand end thereof, as shown in Figs. 1 and 3, straps 25 and 26, the opposite ends of which are secured to the supporting plate or bar 23 adjacent to the left hand end of the segment by suitable fastening devices, as shown at 27. Secured to each segment is a third strap or ribbon 28, which straps are connected with the respective segments near the left hand ends thereof, as shown at 29, and are preferably arranged between the straps 25 and 26. These third straps are connected at their right hand ends with the plate 23 by suitable fastening devices, as shown at 30. It will be apparent, therefore, that when a load is placed on the load platform the segmental arms 9 and 10 will be moved about their axes and that these segments will carry with them in their movement the supporting plate 23 on which the chart 7 is mounted. The arrangement of the segments with relation to the plate 23 is such that the chart will not only be maintained in a vertical position but will be held against vertical movement so that the graduations thereon will always occupy a fixed position with relation to a given horizontal plane. The straps 25, 26 and 28 are drawn taut and form a tight firm connection between the supporting plate and the segments so that there will be no lost motion between the parts and the movement of the segments will be accurately transmitted to the chart. If desired, a stop such as a roller 31 may be arranged above the plate 23 and caused to hold the same against vertical movement.

The second indicating member 8 is here shown in the form of a wire connected at its opposite ends to a supporting member 32 which is pivotally supported at its upper end on a knife edged pivot 33. Connected with the pivot 33 on which the supporting member is mounted is a cam 34 with which is connected a ribbon 35, the lower end of which is connected with a lever 36 of a unit balance, which lever is pivotally mounted at 37. The lever has pivotally mounted on the outer end thereof a unit receptacle 38 and is provided on the inner side of its axis with a weight 39 to counterbalance the outer end thereof and of the unit receptacle. In the present arrangement of the mechanism the supporting member 32 also serves as a pendulum counterbalance for the unit in the receptacle 38, the counterbalancing action being that of a rising pendulum, but it will be obvious that the pendulum may be arranged in any suitable manner.

If desired, the scale may also be provided with means for indicating the weight of the load simultaneously with the indication of the result of the computation. To this end I have mounted on the main frame a weight chart 40 over which travels one end of a weight indicating arm 41 which is rigidly secured to the pivot pin 17 of the segmental arm 9. By means of the apparatus here shown I am enabled to utilize a chart having a single series of graduations to compute a result based on various units of computation, such as units of different weight in counting or other units peculiar to the other computations to be effected. In the case of the counting scale the indicator wire is adjusted automatically by the weight of the article in the unit receptacle, but obviously this adjustment may be effected in any suitable manner, manually or otherwise. As was fully set forth in the application above mentioned the manipulation of the indicating member causes the significance of the graduations on the chart to change with each change of the unit of computation.

In the use of the scale to determine the number of parts in a given mass of like parts the operator will first place in the unit receptacle 38 a unit consisting of one or more parts and the unit balance will then operate to move the indicator wire 8 to an inclined position determined by the weight of the unit. The mass of parts to be counted is then placed upon the load receptacle 6 and causes the chart to be moved transversely to a position determined by the weight of the load. In these positions of the two indicating members the wire will intersect that graduation on the chart which designates the exact number of parts in the mass. It will be noted that the chart carries six columns of figures the figures of each column being associated with the graduations. The columns are numbered, respectively, 1, 2, 5, 10, 20 and 40. When the unit consists of a single part the reading is taken from the column numbered 1. If the unit used by the operator comprises five parts then the reading is taken in the column numbered 5, and so on. Where it is desired to count out a specified number of parts the operation is the same with the exception that the operator will deposit on the load receptacle a sufficient number of parts to cause the wire to intersect that graduation on the chart representing the number of parts desired.

While I have shown and described one embodiment of my invention I wish it to be understood that I do not desire to be limited to the details thereof as various modifications may appear to a person skilled in the art.

Having now fully described my invention what I claim as new and desire to secure by Letters Patent, is:

1. In a scale, a weight actuated member, a pivoted member operatively connected with said weight actuated member and having a curved end portion, an indicating member having supporting connecton with the perimeter of the curved end portion of said movable member, and a second indicating member, the two indicating members being so arranged that one indicating member will move along the other indicating member to indicate the result of a computation.

2. In a scale, a frame member, a supporting member for an indicating device, a movable member having pivotal connection with one of the first mentioned members and having a curved end portion, the perimeter of which is in supporting engagement with the other of said first mentioned members, a weight actuated device operatively connected with said movable member, an indicating device carried by said supporting member, and a second indicating device, the two indicating devices being so arranged that one device will move along the other device to indicate the result of a computation.

3. In a scale, a frame member, a supporting member for an indicating device, a movable member having pivotal connection with one of the first mentioned members and having a portion curved about the axis of said pivotal connection and arranged in supporting engagement with the other of said first mentioned members, a weight actuated device operatively connected with said movable member, an indicating device carried by said supporting member, and a pivoted indicating device movable into intersecting relation with the first mentioned indicating device.

4. In a scale, a substantially horizontal bar, a member movably mounted on said bar and having a segmental end portion, a chart having supporting connection with the segmental portion of said member and having its point of support so arranged with relation to said member that said point of support will be spaced the same distance from said bar in all operative positions of said movable member, a weight actuated member connected with said movable member to control the movement of said chart, and an indicating member arranged adjacent to the path of said chart to indicate thereon the result of a computation.

5. In a scale, a weight actuated member, a pair of movable members operatively connected with said weight actuated member and having segmental end portions, an indicator carried by the segmental end portions of said movable members, and a second indicating member, the two indicating members being so arranged that one indicating member will move along the other indicating member to indicate the result of a computation.

6. In a scale, a weight actuated member, a movable member having a segmental end portion and pivotally mounted at the axis of said segmental portion, a chart connected with the segmental end of said member and movable therewith, a connection between said movable member and said weight actuated member to control the position of said chart, and an indicating member so arranged with relation to the path of movement of said chart that it will indicate thereon the result of a computation.

7. In a scale, a weight actuated member, a movable member having a segmental end portion and pivotally mounted at the axis of said segmental portion, a supporting member having a portion resting on the periphery of said segmental portion of said movable member, a chart secured to said supporting member and movable therewith, a connection between said movable member and said weight actuated member to control the position of said chart, and an indicating member so arranged with relation to the path of movement of said chart that it will indicate thereon the result of a computation.

8. In a scale, a weight actuated member, a pair of movable members each having a segmental end portion and each pivotally mounted on the axis about which the segmental portion thereof is described, a supporting member resting upon the peripheries of the segmental portions of said movable members, a chart carried by said supporting member, an operative connection between one of said movable members and said weight actuated member to control the movement of said chart, and an indicating member so arranged with relation to the path of movement of said chart that it will indicate thereon the result of a computation.

9. In a scale, a weight actuated member, a pair of movable members mounted on parallel axes and spaced one from another, each of said movable members having its outer portion curved about its axis, a supporting plate resting upon the curved portions of said members, straps connecting said plate with the respective supporting members and arranged to hold the same in contact therewith but to permit said parts to have relative movement, whereby said plate will be moved in a straight line by the movement of said members about their axes, a chart carried by said supporting plate, an operative connection between one of said movable members and said weight actuated member to control the movement of said chart, and an indicating member so arranged with relation to the path of movement of said chart that it will indicate thereon the result of a computation.

10. In a scale, a weight actuated member, a pair of movable members mounted on parallel axes and spaced one from another, each of said movable members having its outer portion curved about its axis, a supporting plate resting upon the curved portions of said members, straps connecting said plate with the respective supporting members and arranged to hold the same in contact therewith but to permit said parts to have relative movement, whereby said plate will be moved in a straight line by the movement of said members about their axes, a chart carried by said supporting plate, an operative connection between one of said movable members and said weight actuated member to control the movement of said chart, a pivoted indicating member to cooperate with said chart, and means for moving said pivoted indicating member into a position where it will intersect said chart.

11. In a scale, a weight actuated member, a pair of movable members mounted on parallel axes and spaced one from another, each of said movable members having its outer portion curved about its axis, a supporting plate resting upon the curved portions of said members, straps connecting said plate with the respective supporting members and arranged to hold the same in contact therewith but to permit said parts to have relative movement, whereby said plate will be moved in a straight line by the movement of said members about their axes, a chart carried by said supporting plate, an operative connection between one of said movable members and said weight actuated member to control the movement of said chart, a pivoted indicating member to cooperate with said chart to indicate the result of a computation, and a unit receptacle mounted for movement and adapted to actuate said pivoted indicating member.

12. In a scale, a weight actuated member, a pair of pivoted supporting arms each having a segmental outer end, a connecting member supported by the segmental ends of said arms, means for connecting said connecting member with said arms to cause the same to be moved thereby, an indicating member carried by said connecting member, a second indicating member movable into a position to intersect the first mentioned indicating member, an operative connection between one of said segmental arms and said weight actuated member, and means independent of said weight actuated member for actuating said second indicating member.

13. In a scale, a pair of arms each pivotally mounted near one end, said arms having segmental outer ends, a connecting member supported by said segmental ends of said arms, straps connecting said connecting member with said ends of said arms, a chart rigidly secured to said connecting member, a weight actuated member connected with said arms to control the movement thereof, a unit receptacle, a supporting member operatively connected with said unit receptacle, an indicating wire carried by said supporting member and movable thereby into a position to intersect said chart.

14. In a scale, a weight actuated member, a movable member having a segmental end portion, a chart having supporting connection with said movable member, an operative connection between said weight actuated member and said movable member to control the movement of said chart, and an indicating member so arranged with relation to the path of movement of said chart that it will indicate thereon the result of a computation.

15. In a scale, a weight actuated member, a movable member having a segmental end portion, a chart having supporting connection with said movable member, an operative connection between said weight actuated member and said movable member to control the movement of said chart, an indicating member to cooperate with said chart, a weight chart supported independently of said movable member, and a weight indicating member connected with said movable member and arranged to travel over said weight chart.

16. In a scale, a weight actuated member, a pair of arms pivotally mounted on parallel axes spaced one from another and having segmental end portions, the radii of said segmental portions being equal, a supporting member secured to the peripheries of the segmental portions of said arms and arranged to be actuated thereby, a chart carried by said supporting member and extending transversely to the line of movement thereof, and an operative connection between said weight actuated member and one of said movable members to control the movement of said chart.

17. In a scale, a weight actuated member, a pair of arms pivotally mounted on parallel axes spaced one from another and having segmental end portions, the radii of said segmental portions being equal, a supporting member, means for securing said supporting member to the peripheries of the segmental portions of said arms and causing it to be actuated thereby, a chart carried by said supporting member and extending transversely to the line of movement thereof, an operative connection between said weight actuated member and one of said movable members to control the movement of said chart, a stationary weight chart, and an indicating member rigidly conected with the last mentioned movable member and arranged to travel over said weight chart.

18. In a scale, a weight actuated member, an indicating member, means for supporting said indicating member comprising a movable member operatively connected with said weight actuated member and having a convex end portion on which said indicating member is supported, and a second indicating member, the two indicating members being so arranged that one indicating member will move along the other to a position indicating the result of a computation.

19. In a scale, a frame member, a chart supporting member, a series of movable members each having a convex surface engaging one of said first mentioned members and each pivotally connected at its axis to the other of said first mentioned members, a chart carried by said supporting member, a weight actuated member operatively connected with one of said movable members to control the movement thereof, and an indicating member so arranged with relation to the path of movement of said chart that it will indicate thereon the result of a computation.

20. In a scale, a substantially horizontal bar, a series of members movably mounted on said bar and each having a convex surface, a chart carried by said members and having its point of support so arranged with relation to said members that said point of support will be spaced the same distance from said bar in all operative positions of said members, a weight actuated member connected with one of said members to control the movement of said chart, and an indicating member so arranged with relation to the path of movement of said chart that it will indicate thereon the result of a computation.

21. In a scale, a weight actuated member, a series of movable members each having a convex surface and pivotally mounted at the axis of said convex surface, a chart connected with the convex surface of said members and movable therewith, a connection between one of said members and said weight actuated member to control the position of said chart, and an indicating member so arranged with relation to the path of movement of said chart that it will indicate thereon the result of a computation.

22. In a scale, a weight actuated member, a series of movable members each having a convex surface and each pivotally mounted at the axis of said convex surface, a supporting member having a portion thereof in contact with the convex surface of said movable members, a chart secured to said supporting member and movable therewith, a connection between one of said movable members and said weight actuated member to control the position of said chart, and an indicating member so arranged with relation to the path of movement of said chart that it will indicate thereon the result of a computation.

23. In a scale, a weight actuated member, a series of movable members each having a convex surface, a chart carried by said movable members, an operative connection between said weight actuated member and one of said movable members to control the movement of said chart and an indicating member so arranged with relation to the path of movement of said chart as to indicate thereon the result of a computation.

24. In a scale, a weight actuated member, a series of movable members each having a convex surface, a chart carried by said movable members, an operative connection between said weight actuated member and one of said movable members to control the movement of said chart, an indicating member so arranged with relation to the path of movement of said chart that it will indicate thereon the result of a computation, a weight chart supported independently of said movable members and an indicating member connected with one of said movable members and arranged to travel over said weight chart to indicate the weight of the load on said scale.

25. In a scale, a weight actuated member, an indicating member, means for supporting said indicating member comprising a pivotal member operatively connected with said weight actuated member and having a curved end portion on which said indicating member is supported, and a second indicating member, the two indicating members being so arranged that one indicating member will move along the other indicating member to a position indicating the result of a computation.

26. In a scale, a weight actuated member, an indicating member, a movable supporting member upon which said indicating member is rigidly mounted, and means controlled by said weight actuated member to actuate said supporting member and to so control the movement thereof as to cause said indicating member to move in a substantially straight line.

27. In a scale, a weight actuated member, an indicating member, a movable supporting member upon which said indicating member is rigidly mounted, means controlled by said weight actuated member to actuate said supporting member and to so control the movement thereof as to cause said indicating member to move in a substantially straight line, and a second indicating member, the two indicating members being so arranged that one indicating member will move along the other indicating member to a position indicating the result of a computation.

28. In a scale, a weight actuated member, an indicating member, a movable supporting member upon which said indicating member is rigidly mounted, means controlled by said weight actuated member to actuate said supporting member and to cause said indicating member to move in a substantially straight line, a second indicating member movable to different positions without relation to the first mentioned indicating member to indicate the result of a computation, and means to position said indicating member according to a unit of computation.

29. In a scale, a weight actuated member, an indicating member, a movable supporting member upon which said indicating member is rigidly mounted, means controlled by said weight actuated member to actuate said supporting member and to cause said indicating member to move in a substantially straight line, a second indicating member, the two indicating members being so arranged that one indicating member will move along the other indicating member to a position indicating the result of a computation, a weight chart and an indicating member controlled by said weight actuated member and movable along said chart to indicate the result of a computation.

30. In a scale, a weight actuated member, an indicating member, a movable supporting member upon which said indicating member is rigidly mounted, means controlled by said weight actuated member to actuate said supporting member and to cause said indicating member to move in a substantially straight line, a second indicating member movable independently of said weight actuated member to different positions with relation to said first mentioned indicating member to indicate the result of a computation, a weight chart and an indicating member controlled by said weight actuated member and movable along said chart to indicate the weight of a load on said scale.

31. In a scale, a weight actuated member, an indicating member, a movable supporting member upon which said indicating member is rigidly mounted, means controlled by said weight actuated member to actuate said supporting member and to cause said indicating member to move in a substantially straight line, a second indicating member movable independently of said weight actuated member to different positions with relation to said first mentioned indicating member to indicate the result of a computation, means to position said second indicating member according to a unit of computation, a weight chart and an indicating member controlled by said weight actuated member and arranged to move over said weight chart.

In testimony whereof, I affix my signature hereto.

WILLIAM R. MITTENDORF.